United States Patent

Hasegawa et al.

(10) Patent No.: US 10,850,995 B2
(45) Date of Patent: Dec. 1, 2020

(54) FILTRATION AID AND FILTRATION TREATMENT METHOD

(71) Applicant: Dexerials Corporation, Tokyo (JP)

(72) Inventors: Masato Hasegawa, Tokyo (JP); Ryu Shimada, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 26 days.

(21) Appl. No.: 15/559,334

(22) PCT Filed: Feb. 24, 2016

(86) PCT No.: PCT/JP2016/055470
§ 371 (c)(1),
(2) Date: Sep. 18, 2017

(87) PCT Pub. No.: WO2016/152365
PCT Pub. Date: Sep. 29, 2016

(65) Prior Publication Data
US 2018/0111110 A1    Apr. 26, 2018

(30) Foreign Application Priority Data

Mar. 20, 2015 (JP) ................... 2015-057109

(51) Int. Cl.
*C02F 1/56* (2006.01)
*C02F 1/52* (2006.01)
*C02F 11/14* (2019.01)
*B01J 20/24* (2006.01)
*C02F 1/64* (2006.01)
(Continued)

(52) U.S. Cl.
CPC ............... *C02F 1/56* (2013.01); *B01J 20/24* (2013.01); *C02F 1/52* (2013.01); *C02F 1/5263* (2013.01); *C02F 1/64* (2013.01); *C02F 11/14* (2013.01); *C02F 2101/103* (2013.01);
(Continued)

(58) Field of Classification Search
None
See application file for complete search history.

(56) References Cited

U.S. PATENT DOCUMENTS

2003/0159987 A1    8/2003  Jensen
2005/0161407 A1    7/2005  McPhillips
(Continued)

FOREIGN PATENT DOCUMENTS

CN    102198407    9/2011
CN    102247814    11/2011
(Continued)

OTHER PUBLICATIONS

Shitanda et al. (Drying Technology, 2010, pp. 95-98, Abstract) (Year: 2010).*
(Continued)

*Primary Examiner* — Clare M Perrin
(74) *Attorney, Agent, or Firm* — Carmody Torrance Sandak & Hennessey LLP

(57) ABSTRACT

Provided is a filtration aid used when filtering, for example, sludge generated in a purification treatment process for water such as industrial wastewater and including a pulverized product of *Corchorus olitorius*, wherein a median diameter of the pulverized product is 150 micrometers or greater.

6 Claims, 1 Drawing Sheet

(51) Int. Cl.
  *C02F 101/10* (2006.01)
  *C02F 101/14* (2006.01)
  *C02F 101/20* (2006.01)
  *C02F 101/22* (2006.01)

(52) U.S. Cl.
  CPC ...... *C02F 2101/14* (2013.01); *C02F 2101/20* (2013.01); *C02F 2101/203* (2013.01); *C02F 2101/22* (2013.01)

(56) References Cited

U.S. PATENT DOCUMENTS

| | | | | |
|---|---|---|---|---|
| 2009/0272693 | A1* | 11/2009 | Mabille | B01J 20/26 |
| | | | | 210/683 |
| 2011/0094968 | A1 | 4/2011 | Spittle et al. | |
| 2013/0299433 | A1* | 11/2013 | Inagaki | C02F 1/5263 |
| | | | | 210/730 |
| 2014/0374357 | A1* | 12/2014 | Roy | C02F 1/286 |
| | | | | 210/670 |

FOREIGN PATENT DOCUMENTS

| | | |
|---|---|---|
| CN | 103508533 | 1/2014 |
| GB | 1370446 | 10/1974 |
| JP | S49083681 | 8/1974 |
| JP | S52002877 | 1/1977 |
| JP | H07308527 | 11/1995 |
| JP | H09-117776 | 5/1997 |
| JP | 11114313 | 4/1999 |
| JP | 11114314 | 4/1999 |
| JP | 2004000923 | 1/2004 |
| JP | 2011194384 | 10/2011 |
| JP | 2011194385 | 10/2011 |
| JP | 2013078717 | 5/2013 |
| JP | 2014008428 | 1/2014 |
| JP | 2014505588 | 3/2014 |
| RU | 2241730 | 12/2004 |
| RU | 2293069 | 6/2005 |
| TW | 201139288 | 11/2011 |
| TW | 201228946 | 7/2012 |
| UA | 47749 | 2/2010 |
| WO | 2010131492 | 11/2010 |
| WO | 0107750 | 2/2011 |
| WO | 2013090569 | 6/2013 |
| WO | WO-2013090569 A2 * | 6/2013 ............... C02F 9/00 |

OTHER PUBLICATIONS

European Patent Office, Extended Search Report issued in corresponding European application No. 16768268.1, dated Oct. 2, 2018.
Federal Service for Intellectual Property, Decision to Grant in corresponding Russian application No. 2017134280/05 (060433), dated Apr. 26, 2019.
European Patent Office, Extended Search Report issued in European application No. 16772316.2, dated Oct. 1, 2018.
The Patent Office of the People's Republic of China, First Office Action in Chinese Application No. 201680018554.1, dated Jan. 18, 2019.
The Patent Office of the People's Republic of China, Second Office Action for Chinese Application No. 201680010554.1, dated Jul. 19, 2019.
The Patent Office of the People's Republic of China, First Office Action for Chinese Application No. 201680019448.5, dated Jan. 21, 2019.
Shimada, et al., News of Flowers from Standing Director, Atomi University Nosanfu [online], 2010.
General Directorate of Intellectual Property, Office Action issued in Indonesian Application No. P00201707443, dated Jul. 15, 2019.
The Patent Office of the People's Republic of China, Second Office Action issued in Chinese Application No. 201680019448.5, dated Jul. 19, 2019.
Taiwanese Patent Office, Office Action issued in Taiwanese Application No. 105108400, dated Aug. 12, 2019.
Taiwanese Patent Office, Office Action issued in Taiwanese Application No. 105108800, dated Aug. 23, 2019.
Taiwanese Patent Office, Office Action issued in Taiwanese Application No. 105106180, dated Jul. 12, 2019.
Indian Patent Office, Examination Report issued in corresponding Indian Application No. 201737036029, dated Nov. 29, 2019.
European Patent Office, European Official Communication issued in EP16768268.1, dated Oct. 29, 2019.

* cited by examiner

"Intermediate jute No. 3": identification number     1 2 0 9 0 0 6

"Intermediate kenaf": identification number     1 2 0 9 0 0 1

FILTRATION AID AND FILTRATION TREATMENT METHOD

TECHNICAL FIELD

The present invention relates to a filtration aid used when filtering, for example, sludge generated in a purification treatment process for water such as industrial wastewater, and a filtration treatment method using the filtration aid.

BACKGROUND ART

In recent years, a large amount of waste liquids containing environmentally hazardous substances such as metal ions and fluorine ions as inorganic ions have been generated in the processes for producing various products in plants.

Hitherto, examples of the method for removing impurity ions from wastewater from plants include a flocculating precipitation method, an ion-exchange method, a method for adsorption to an adsorbent such as activated charcoal, an electrosorption method, and a magnetic adsorption method.

For example, when wastewater is treated by the flocculating precipitation method, the wastewater is separated into a supernatant and a precipitate (also referred to as sludge). The purified supernatant is released, and the precipitate is disposed of as an industrial waste.

In this case, it is difficult to dispose of the sludge separated by settling, as is. This is because the sludge contains a large amount of moisture, so there is a massive amount to be disposed of, to run up the disposal costs. Hence, the sludge generated in the process for treating wastewater is typically subjected to a dehydration treatment by filtration in order to further reduce the amount of moisture in the sludge. Then, the sludge dehydrated through the filtration process is disposed of.

However, it is not easy to dehydrate the sludge. As the dehydration treatment by filtration, the sludge is dehydrated with a filter medium such as a filter cloth. In this case, layers of muddy sludge accumulate on the filter cloth, and the filter cloth surface is clogged as the filtration goes on. As more sludge layers accumulate, sludge layers closer to the filter cloth surface are densified and solidified, to worsen passage of water and reduce the dehydration speed.

Hence, a method that can effectively dehydrate sludge in a short time has been demanded.

As a method for filtering a flocculated matter after flocculating precipitation, for example, there has been proposed a method of adding a base to wastewater including heavy metal ions to hydroxylate most of the heavy metal ions to insolubilize the heavy metal ions, and then filtering and removing the flocculated matter using a cellulose-based filter (see, e.g., PTL 1).

However, there is a problem that the proposed filtration method takes time for the filtration process.

CITATION LIST

Patent Literature

PTL 1: Japanese Patent Application Laid-Open (JP-A) No. 09-117776

SUMMARY OF INVENTION

Technical Problem

Hence, it has been desired to provide a filtration treatment method that can filter sludge in a short time during a dehydration treatment of the sludge, and a filtration aid that can be used effectively in such a filtration treatment and can improve filtration efficiency.

The present invention aims for solving the various problems in the related art and achieving an object described below. That is, the present invention has an object to provide a filtration aid that can improve filtration efficiency and a filtration treatment method using the filtration aid.

Solution to Problem

Means for solving the above problems are as follows.
<1> A filtration aid, including:
  a pulverized product of *Corchorus olitorius*,
  wherein a median diameter of the pulverized product is 150 micrometers or greater.
<2> The filtration aid according to <1>,
  wherein the *Corchorus olitorius* is "intermediate jute No. 4" under nationally identified hemp 2013, which is an identification number in Institute of Bast Fiber Crops, Chinese Academy of Agricultural Sciences.
<3> The filtration aid according to <1>,
  wherein the *Corchorus olitorius* is "intermediate jute No. 1" under XPD005-2005, which is an identification number in Institute of Bast Fiber Crops, Chinese Academy of Agricultural Sciences.
<4> The filtration aid according to <1>,
  wherein the *Corchorus olitorius* is "intermediate kenaf" under No. 1209001, which is an identification number in Institute of Bast Fiber Crops, Chinese Academy of Agricultural Sciences.
<5> The filtration aid according to any one of <1> to <4>,
  wherein the filtration aid is used when filtering sludge generated in a purification treatment process for wastewater including an inorganic unnecessary substance.
<6> A filtration treatment method for insolubilizing an inorganic ion contained in an inorganic unnecessary substance included in wastewater to form a microfloc, which is a suspended solid matter, in the wastewater including the inorganic unnecessary substance, and filtering the wastewater including the microfloc, the filtration treatment method including:
  adding the filtration aid according to any one of <1> to <4> to the wastewater including the microfloc and then filtering the wastewater including the microfloc.
<7> The filtration treatment method according to <6>, including:
  insolubilizing an inorganic ion contained in an inorganic unnecessary substance included in wastewater to form a microfloc, which is a suspended solid matter, in the wastewater including the inorganic unnecessary substance, flocculating and settling the microfloc to separate the wastewater into a supernatant and sludge by settling, adding the filtration aid to a settling separation product formed of: the supernatant including the microfloc; and the sludge, and then filtering the settling separation product.
<8> The filtration treatment method according to <7>, including after adding the filtration aid to the settling separation product;
  separating the sludge from the settling separation product and filtering the sludge.
<9> The filtration treatment method according to <6>, including:
  insolubilizing an inorganic ion contained in an inorganic unnecessary substance included in wastewater to form a microfloc, which is a suspended solid matter, in the wastewater including the inorganic unnecessary substance, flocculating and settling the microfloc to separate the wastewater into a supernatant and sludge by settling, separating the sludge from a settling separation product formed of: the supernatant including the microfloc; and the sludge, adding the filtration aid to the sludge, and then filtering the sludge.
<10> The filtration treatment method according to any one of <6> to <9>,
wherein the wastewater is wastewater including the inorganic unnecessary substance containing at least any one of nickel, fluorine, iron, copper, zinc, chromium, arsenic, cadmium, and lead.
<11> The filtration treatment method according to any one of <6> to <10>,
wherein the inorganic ion contained in the inorganic unnecessary substance is at least any one of a nickel ion, a fluorine ion, an iron ion, a copper ion, a zinc ion, a chromium ion, an arsenic ion, a cadmium ion, and a lead ion.
<12> The filtration treatment method according to any one of <6> to <11>, including:
adding a polymeric flocculant together when adding the filtration aid.
<13> The filtration treatment method according to <12>,
wherein a ratio by mass between an adding amount of the *Corchorus olitorius* in the filtration aid and an adding amount of the polymeric flocculant is from 90:10 through 10:90.
<14> The filtration treatment method according to <13>,
wherein the ratio by mass between the adding amount of the *Corchorus olitorius* in the filtration aid and the adding amount of the polymeric flocculant is from 70:30 through 30:70.
<15> The filtration treatment method according to any one of <12> to <14>,
wherein the polymeric flocculant is a polyacrylamide.
<16> The filtration treatment method according to any one of <6> to <15>,
wherein an adding amount of the *Corchorus olitorius* in the filtration aid is 2 mg/L or greater relative to a solid content in the wastewater including the microfloc.

Advantageous Effects of Invention

The present invention can solve the various problems in the related art, achieve the object described above, and provide a filtration aid that can improve filtration efficiency and a filtration treatment method using the filtration aid.

Figures 1, 2:
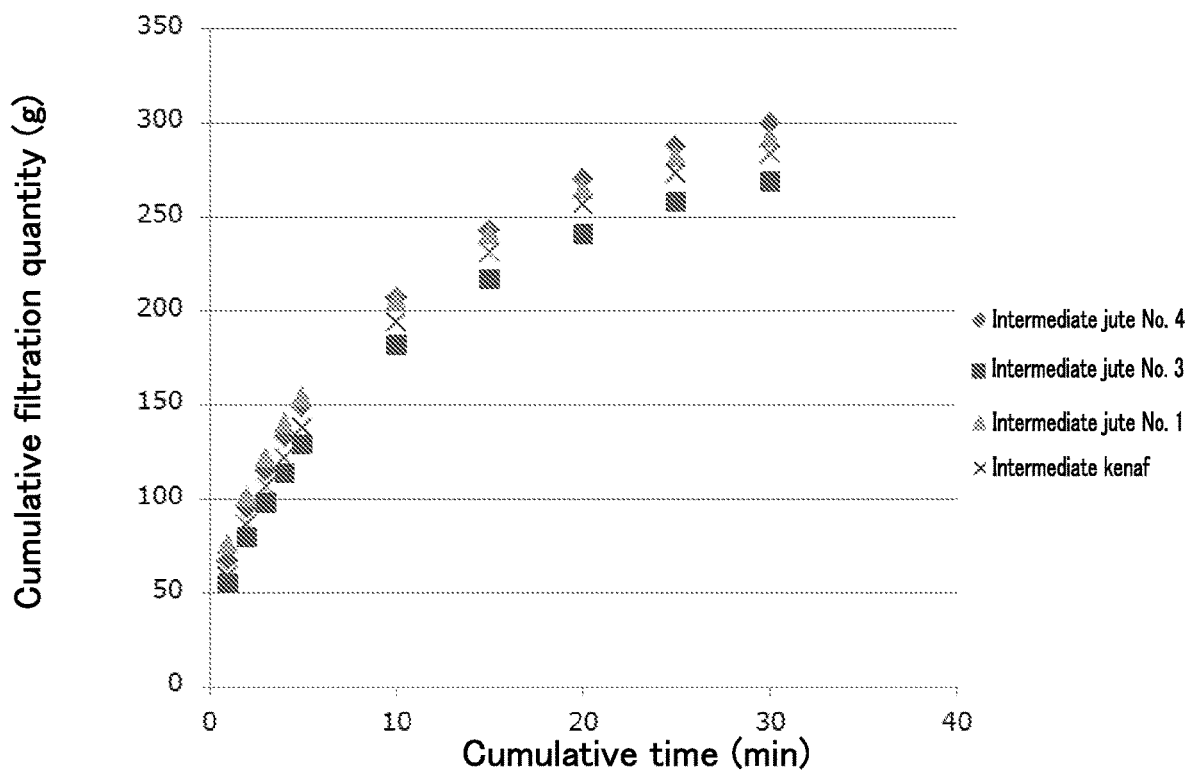
FIG. 1 is a graph plotting a result of an experiment for evaluating filtration performance by changing the kind of *Corchorus olitorius* in a filtration aid of the present invention.
FIG. 2 is a diagram illustrating identification numbers of "intermediate jute No. 3" and "intermediate kenaf" used in the present invention.

Description of Embodiments (Filtration Aid)
A filtration aid of the present invention is formed of a pulverized product of *Corchorus olitorius*.
The median diameter of the pulverized product is 150 micrometers or greater.
The filtration aid of the present invention satisfying the requirement described above is a filtration aid that can improve filtration efficiency.

The present inventors have earnestly studied a method that can efficiently filter and dispose of sludge generated in a purification treatment process for wastewater from plants. As a result, it has been found that a pulverized product of *Corchorus olitorius* exhibits an excellent filtration performance to sludge that is difficult to dehydrate.
Furthermore, it has been found effective to define the median diameter of the pulverized product within a specific range in order to make *Corchorus olitorius* sufficiently exert its filtration performance.
The reason is uncertain but considered as follows.
The target of the present invention is industrial wastewater, e.g., industrial wastewater including an inorganic unnecessary substance such as nickel, fluorine, iron, copper, zinc, chromium, arsenic, cadmium, and lead. For removal of the inorganic unnecessary substance from the wastewater (also described as purification of water), the present invention insolubilizes inorganic ions such as nickel ion, fluorine ion, and iron ion contained in the inorganic unnecessary substance, to form a suspended solid matter (also referred to as microfloc in the present invention), and flocculates and settles the microfloc, to separate the wastewater into a supernatant and a precipitate (also referred to as sludge or slurry).
Next, the wastewater including: the supernatant including the microfloc; and the precipitate is filtered, or the precipitate is filtered. At the time, for improvement of filtration treatment efficiency, use of the pulverized product of *Corchorus olitorius* as a filtration aid (also referred to as dehydrating agent) for promoting a dehydrating effect is considered to:
(i) promote a dehydrating effect of removing moisture from sludge, because a vascular bundle structure portion (particularly, a stem portion) of *Corchorus olitorius* has a porous shape including a through-hole and water passes through the straw-shaped portion during filtration; and
(ii) promote a dehydrating effect of removing moisture from sludge, because a fibrous portion (particularly, an epidermal portion) of *Corchorus olitorius*, when present in sludge, makes water flow through voids in the sludge along the fibers.
At the time, particularly when the median diameter of the pulverized product is 150 micrometers or greater, *Corchorus olitorius* can sufficiently exert its dehydrating effect as presented in Examples below. This is considered to be because when the median diameter is less than 150 micrometers, the straw-shaped pathways for water mentioned above cannot be secured sufficiently.
When the median diameter of the pulverized product is 150 micrometers or greater, it is considered that characteristics of *Corchorus olitorius* can be taken advantage of, so a sufficient dehydrating effect can be exhibited and an excellent filtration performance can be exerted.
A specific constitution of the filtration aid will be described below.
<*Corchorus olitorius*>
A portion of *Corchorus olitorius* that is preferable for use is leaf, stalk, or skin. Among *Corchorus olitorius*, *Corchorus olitorius* produced in Changsha City of China, or "intermediate jute No. 4" under nationally identified hemp 2013, which is an identification number in Institute of Bast Fiber Crops, Chinese Academy of Agricultural Sciences, "intermediate jute No. 3" under No. 1209006, which is an identification number in Institute of Bast Fiber Crops, Chinese Academy of Agricultural Sciences, "intermediate jute No. 1" under XPD005-2005, which is an identification number in Institute of Bast Fiber Crops, Chinese Academy of Agricultural Sciences, or "intermediate kenaf" under No. 1209001, which is an identification number in Institute of Bast Fiber Crops, Chinese Academy of Agricultural Sciences is preferable for use. "Intermediate jute No. 4", "intermediate jute No. 1", and "intermediate kenaf" are more preferable, and "intermediate jute No. 4" is particularly preferable.

The identification numbers of "intermediate jute No. 3" and "intermediate kenaf" are presented in FIG. 2.

"Intermediate jute No. 4" has the following characteristics.

Kind of agricultural product: jute

Source of breed: a product obtained by breeding a hybridized F1 generation between Hunan jute No. 3 and 0-4(1), with Hunan jute No. 3.

Characteristics: Intermediate jute No. 4 is a typical type of *Corchorus olitorius* jute that has green cylindrical stalks, scattered acicular leaves, green petioles, a small angle from the main stalk, lateral buds and stipules, green calyces, and a cylindrical shape of a long fruit. A 5-locule species is a late-maturing breed.

<Pulverized Product of *Corchorus olitorius*>

The pulverized product of *Corchorus olitorius* is excellent in a filtration effect of obtaining a dehydrated cake having a low water content from sludge that is difficult to dehydrate as presented in Examples below, and effectively serves as a filtration aid to be used when filtering sludge that is generated in a purification treatment process for wastewater including an inorganic unnecessary substance. The pulverized product has the following properties.

«Median Diameter»

The median diameter of the pulverized product defined in the present invention is 150 micrometers or greater. It is particularly preferable that the median diameter be in a range of 200 micrometers or greater but 850 micrometers or less.

When the median diameter is 150 micrometers or greater, it is considered that the porosity and straw shape of *Corchorus olitorius* can secure pathways for water during filtration. Particularly, when the median diameter is 200 micrometers or greater, pathways for water can be secured sufficiently, and the dehydrating effect can be exhibited sufficiently.

On the other hand, when the median diameter is 850 micrometers or less, there is no risk of clogging ducts provided in, for example, a pulverizer or an automatic feeder. Therefore, the pulverized product can be favorably used in an automatic purification apparatus. This is good for practical use.

The median diameter (also referred to as d50) is a diameter of a. particle plotted at 50% of all particles when the pulverized product is plotted by the size of particle diameter (i.e., a particle diameter that makes particles having larger diameters and particles having smaller diameters equal in quantity). In the present invention, a particle diameter refers to volume particle diameter.

The median diameter can be measured with a commercially available measuring instrument.

<Method for Producing Pulverized Product>

The pulverized product defined in the present invention is produced by pulverizing dry *Corchorus olitorius* by coarse pulverization and fine pulverization in this order until a desired median diameter is obtained, with appropriate selection of a rotary blade and a stationary blade.

As the pulverizer, a typical hammer mill-type pulverizer, e.g., CEREN MILLER available from Masuko Sangyo Co., Ltd. can be used.

After the pulverization, a classifying step of classifying the pulverized product by sieving may be provided.

In the classifying step, the pulverized powder may be subjected to a classifier, e.g., a vibration sieve machine or a cartridge-type sieve machine, to classify a pulverized product of which particle diameter is within a predetermined range, so that the median diameter may be within a range of 150 micrometers or greater.

Furthermore, in the present invention, it is more preferable to proactively classify and remove (cut) pulverized products less than 150 micrometers and pulverized products greater than 850 micrometers by sieving, and use only pulverized products of which particle diameter is within a range of from 150 micrometers through 850 micrometers.

(Filtration Treatment Method)

A filtration treatment method of the present invention is a method of filtering sludge generated in a purification treatment process for wastewater including an inorganic unnecessary substance or the wastewater including the sludge with the use of the filtration aid of the present invention described above.

That is, the filtration treatment method of the present invention is a filtration treatment method of insolubilizing an inorganic ion contained in an inorganic unnecessary substance included in wastewater to form a microfloc, which is a suspended solid matter, in the wastewater including the inorganic unnecessary substance, and filtering the wastewater including the microfloc. The filtration treatment method is a method of adding the filtration aid of the present invention to the wastewater including the microfloc and then filtering the wastewater including the microfloc.

Examples of the inorganic unnecessary substance include an inorganic unnecessary substance that contains at least any one of nickel, fluorine, iron, copper, zinc, chromium, arsenic, cadmium, and lead.

The filtration treatment method of the present invention includes, for example, the modes (A) and (B) described below.

(A) An inorganic ion such as a nickel ion, a fluorine ion, or an iron ion contained in an inorganic unnecessary substance included in wastewater is insolubilized to form a microfloc, which is a suspended solid matter, in the wastewater including the inorganic unnecessary substance, the microfloc is flocculated and settled to separate the wastewater into a supernatant and sludge by settling, the filtration aid of the present invention is added to a settling separation product formed of the supernatant including the microfloc; and the sludge, and then the settling separation product is filtered.

Alternatively, in the method described above, after the filtration aid is added to the settling separation product, the sludge may be separated from the settling separation product, and the sludge may be filtered.

(B) An inorganic ion such as a nickel ion, a fluorine ion, or an iron ion contained in an inorganic unnecessary substance included in wastewater is insolubilized to form a microfloc, which is a suspended solid matter, in the wastewater including the inorganic unnecessary substance, the microfloc is flocculated and settled to separate the wastewater into a supernatant and sludge by settling, the sludge is separated from a settling separation product formed of: the supernatant including the microfloc; and the sludge, the filtration aid of the present invention is added to the sludge, and then the sludge is filtered.

In (A) and (B) described above, the inorganic ion refers to, for example, a nickel ion, a fluorine ion, an iron ion, a copper ion, a zinc ion, a chromium ion, an arsenic ion, a cadmium ion, and a lead ion.

<Addition of Polymeric Flocculant Before Filtration Treatment>

In the filtration treatment method of the present invention, it is possible to add a polymeric flocculant together when adding the filtration aid of the present invention. Examples below indicate that combined use of a polymeric flocculant with the filtration aid of the present invention resulted in improvement of the filtration speed. Hence, it is preferable to add a polymeric flocculant together when adding the filtration aid of the present invention.

Addition of a polymeric flocculant before filtration treatment will be described below in detail.

The present inventors consider the reason why it is better to add a polymeric flocculant together as follows. It is considered that in filtration, *Corchorus olitorius* tends to accumulate near a filter cloth, whereas the polymeric flocculant tends to be positioned in upper layers of sludge layers. Therefore, it is considered that combined use of the polymeric flocculant with *Corchorus olitorius* can secure pathways through which water passes throughout all layers of the sludge layers. Hence, it is considered that combined use of the polymeric flocculant can take advantage of the dehydrating effect of *Corchorus olitorius* and can further improve the dehydrating effect.

Adding a polymeric flocculant together with the filtration aid of the present invention may be either of adding the polymeric flocculant simultaneously with the filtration aid of the present invention, and adding the polymeric flocculant after adding the filtration aid of the present invention and before performing the filtration treatment.

When adding the polymeric flocculant together with the filtration aid of the present invention, the ratio by mass between the adding amount of *Corchorus olitorius* in the filtration aid and the adding amount of the polymeric flocculant is preferably from 90:10 through 10:90, more preferably from 70:30 through 30:70, and particularly preferably 50:50.

In the range described above, an effect of dehydrating sludge layers is sufficiently exhibited. The ratio by mass is calculated based on dry mass.

Examples of the polymeric flocculant include the followings.

«Polymeric flocculant»

As the polymeric flocculant, it is preferable to use a polymeric flocculant that exhibits an effect of promoting a filtration effect in a filtration treatment process and also exhibits an effect of removing the inorganic unnecessary substance in wastewater. Examples of the polymeric flocculant include polyacrylamide (PAM), a salt obtained by partially hydrolyzing polyacrylamide, sodium alginate, sodium polyacrylate, and CMC sodium salt. Among these polymeric flocculants, polyacrylamide is preferable for use. As the polyacrylamide, for example, commercially available products FLOPAN AN 905, FLOPAN AN 926, and FLOPAN AN 956 (available from SNF Japan Co., Ltd.) can be used.

<Addition of Filtration Aid of the Present Invention Before Filtration Treatment>

The adding amount of *Corchorus olitorius* in the filtration aid of the present invention when adding the filtration aid is preferably 2 mg/L or greater relative to a solid content in the wastewater including the microfloc. In this range, an effect of dehydrating sludge layers is sufficiently exhibited.

<Insolubilizing Treatment>

In the insolubilizing treatment, for example, a base is added to wastewater to make the wastewater basic and solubilize the inorganic ion. Further, after the base is added, it is possible to add a polymeric flocculant alone. In this case, addition of a polymeric flocculant alone before addition of the filtration aid of the present invention can increase the floc size of the microfloc in the wastewater.

Examples of the polymeric flocculant used in the insolubilizing treatment include the polymeric flocculants mentioned in the section «Polymeric flocculant» described in the subject about addition of a polymeric flocculant before filtration treatment.

<Filtration Treatment>

The filter used for filtration is not particularly limited and may be appropriately selected depending on the intended purpose. Ordinary commercially available products can be used. In Examples below, an ordinarily used filter cloth was used because an intended object was to improve filtration efficiency (shorten a filtration time). For performing filtration with a view to further improving efficiency of removing a microfloc in the same filtration time as hitherto taken, a filter with a finer mesh may be used.

It is possible to perform pressurization during filtration, and it is preferable to use a pressurizing filtration machine. The pressure at the time is preferably from 0.1 MPa through 2.0 MPa and more preferably from 0.4 MPa through 1.5 MPa.

EXAMPLES

The present invention will be described below by way of Examples. The present invention should not be construed as being limited to these Examples.

Example 1

As wastewater used for experiment, an aqueous solution (800 g) including nickel ion (50 mg/L) was prepared by dissolving nickel chloride in pure water (virtual wastewater).

Next, caustic soda was supplied to the wastewater to adjust pH to 10, and the wastewater was stirred to insolubilize nickel.

Further, as a polymeric flocculant, polyacrylamide (0.0056 g) (0.1% by mass) was added, and the wastewater was stirred to precipitate most of the microfloc.

Through this experiment, the nickel aqueous solution was separated into a supernatant including the microfloc and a precipitate. The nickel ion concentration in the supernatant was ≤0.2 mg/L.

<Filtration Aid>

Next, a dry product of *Corchorus olitorius* (produced in Changsha City of China) was pulverized with a pulverizer by coarse pulverization and fine pulverization in this order until the median diameter became 200 micrometers, with appropriate selection of a rotary blade and a stationary blade. In this way, a pulverized product 1 was obtained, and the pulverized product 1 was used as a filtration aid 1.

Next, the filtration aid 1 was added to the wastewater formed of: the supernatant including the microfloc; and the precipitate, and the wastewater was stirred. Here, the filtration aid 1 was added in an amount of 7 mg/L relative to a solid content in the wastewater. As the method for measuring the "solid content", the solid content can be obtained by back calculation from a slurry concentration in the wastewater measured with a moisture meter.

Subsequently, filtration was performed with a small-sized dehydrator (with a filter chamber thickness of 13 mm and a filtration bed area of 0.00237 m$^2$) under a pressure condition of 0.45 MPa with a filter cloth having an air permeability of 280 cc/cm$^2$·min for 30 minutes.

The mass of the filtrate was measured and a ratio of the filtration quantity was evaluated under the conditions described below. The amount of slurry was 800 g.

The filtration quantity per hour varies depending on the slurry concentration and the kind of the product. Therefore, the ratios below were obtained by comparing the filtration quantity in a predetermined time with a case where the filtration aid of the present invention formed of *Corchorus olitorius* was not added (without addition).

A: Greater than 1.3 times as large
B: Greater than 1.2 times as large but equal to or less than 1.3 times as large
C: Greater than 1.05 times as large but equal to or less than 1.2 times as large
D: Equal to or less than 1.05 times as large When the measurement result was C or greater, the dehydration performance can be judged as effective. Based on the result in the comparative test, a 5% increase was judged as being within a margin of error, so the grade D was equal to or less than 1.05 times as large.

The evaluation result of Example 1 is presented in Table 1-1. In Table 1-1, PAM stands for polyacrylamide (the same applies in Table 1-2 to Table 1-5).

Example 2

An experiment was conducted in the same manner as in Example 1, except that unlike in Example 1, polyacrylamide as a polymeric flocculant was added simultaneously when the filtration aid 1 was added.

For the addition, the ratio by mass between the adding amount of the *Corchorus olitorius* (produced in Changsha City of China) in the filtration aid 1 and the adding amount of the polymeric flocculant was adjusted to 50:50, and the total of the filtration aid formed of *Corchorus olitorius* (produced in Changsha City of China) and the polymeric flocculant was adjusted to 7 mg/L relative to a solid content in the wastewater.

The dehydration performance as the filtration efficiency was evaluated in the same manner as in Example 1. The evaluation result of Example 2 is presented in Table 1-1.

Example 3

An experiment was conducted in the same manner as in Example 2, except that unlike in Example 2, "intermediate jute No. 4" under 2013, which was an identification number in Institute of Bast Fiber Crops, Chinese Academy of Agricultural Sciences was used as *Corchorus olitorius*.

The dehydration performance as the filtration efficiency was evaluated in the same manner as in Example 2. The evaluation result of Example 3 is presented in Table 1-1.

Example 4

An experiment was conducted in the same manner as in Example 3, except that unlike in Example 3, the ratio by mass between the adding amount of the "intermediate jute No. 4" in the filtration aid 1 and the adding amount of the polymeric flocculant was changed to 90:10 (however, the total amount (7 mg/L) of the intermediate jute No. 4 and the polymeric flocculant to be added relative to the solid content was not changed).

The dehydration performance as the filtration efficiency was evaluated in the same manner as in Example 3. The evaluation result of Example 4 is presented in Table 1-1.

Example 5

An experiment was conducted in the same manner as in Example 3, except that unlike in Example 3, the ratio by mass between the adding amount of the "intermediate jute No. 4" in the filtration aid 1 and the adding amount of the polymeric flocculant was changed to 70:30 (however, the total amount (7 mg/L) of the intermediate jute No. 4 and the polymeric flocculant to be added relative to the solid content was not changed).

The dehydration performance as the filtration efficiency was evaluated in the same manner as in Example 3. The evaluation result of Example 5 is presented in Table 1-1.

Example 6

An experiment was conducted in the same manner as in Example 3, except that unlike in Example 3, the ratio by mass between the adding amount of the "intermediate jute No. 4" in the filtration aid 1 and the adding amount of the polymeric flocculant was changed to 30:70 (however, the total amount (7 mg/L) of the intermediate jute No. 4 and the polymeric flocculant to be added relative to the solid content was not changed).

The dehydration performance as the filtration efficiency was evaluated in the same manner as in Example 3. The evaluation result of Example 6 is presented in Table 1-2.

Example 7

An experiment was conducted in the same manner as in Example 3, except that unlike in Example 3, the total adding amount of the intermediate jute No. 4 and the polymeric flocculant relative to the solid content was changed to 3.5 mg/L.

The dehydration performance as the filtration efficiency was evaluated in the same manner as in Example 3. The evaluation result of Example 7 is presented in Table 1-2.

Example 8

An experiment was conducted in the same manner as in Example 3, except that unlike in Example 3, the total adding amount of the intermediate jute No. 4 and the polymeric flocculant relative to the solid content was changed to 1 mg/L.

The dehydration performance as the filtration efficiency was evaluated in the same manner as in Example 3. The evaluation result of Example 8 is presented in Table 1-2.

Example 9

An experiment was conducted in the same manner as in Example 3, except that unlike in Example 3, a pulverized product was obtained by performing pulverization in a manner that the median diameter would be 150 micrometers.

The dehydration performance as the filtration efficiency was evaluated in the same manner as in Example 3. The evaluation result of Example 9 is presented in Table 1-2.

Example 10

As wastewater used for experiment, an aqueous solution (800 g) including fluorine ion (2,500 mg/L) was prepared by dissolving potassium fluoride in pure water (virtual wastewater).

Next, calcium chloride (8.6 mg/L) was added to the wastewater, and the wastewater was stirred while adding sodium hydroxide to adjust pH to from 7.5 through 9.0, to insolubilize fluorine.

The fluorine ion concentration in the supernatant was ≤10 mg/L.

An experiment was conducted in the same manner as in Example 3, except the above described.

The dehydration performance as the filtration efficiency was evaluated in the same manner as in Example 3. The evaluation result of Example 10 is presented in Table 1-2.

Example 11

As wastewater used for experiment, an aqueous solution (800 g) including iron ion (200 mg/L) was prepared by dissolving ferric chloride hexahydrate in pure water (virtual wastewater).

Next, the wastewater was stirred while adding sodium hydroxide to adjust pH to from 6.5 through 9.0, to insolubilize iron.

The iron ion concentration in the supernatant was ≤1.0 mg/L.

An experiment was conducted in the same manner as in Example 3, except the above described.

The dehydration performance as the filtration efficiency was evaluated in the same manner as in Example 3. The evaluation result of Example 11 is presented in Table 1-3.

Example 12

As wastewater used for experiment, an aqueous solution (800 g) including copper ion (100 mg/L) was prepared by dissolving copper sulfate pentahydrate in pure water (virtual wastewater).

Next, the wastewater was stirred while adding sodium hydroxide to adjust pH to from 7.0 through 8.0, to insolubilize copper.

The copper ion concentration in the supernatant was ≤1.0 mg/L. An experiment was conducted in the same manner as in Example 3, except the above described.

The dehydration performance as the filtration efficiency was evaluated in the is same manner as in Example 3. The evaluation result of Example 12 is presented in Table 1-3.

Example 13

As wastewater used for experiment, an aqueous solution (800 g) including zinc ion (100 mg/L) was prepared by dissolving zinc nitrate hexahydrate in pure water (virtual wastewater).

Next, the wastewater was stirred while adding sodium hydroxide to adjust pH to from 9.0 through 9.5, to insolubilize zinc.

The zinc ion concentration in the supernatant was ≤3.0 mg/L.

An experiment was conducted in the same manner as in Example 3, except the above described.

The dehydration performance as the filtration efficiency was evaluated in the same manner as in Example 3. The evaluation result of Example 13 is presented in Table 1-3.

Example 14

As wastewater used for experiment, an aqueous solution (800 g) including chromium ion (100 mg/L) was prepared by dissolving potassium dichromate in pure water (virtual wastewater).

Next, the wastewater was stirred while adding sodium hydroxide to adjust pH to from 6.0 through 7.5, to insolubilize chromium.

The chromium ion concentration in the supernatant was ≤1.0 mg/L.

An experiment was conducted in the same manner as in Example 3, except the above described.

The dehydration performance as the filtration efficiency was evaluated in the same manner as in Example 3. The evaluation result of Example 14 is presented in Table 1-3.

Example 15

As wastewater used for experiment, an aqueous solution (800 g) including arsenic ion (10 mg/L) was prepared by dissolving diarsenic trioxide in pure water (virtual wastewater).

Next, ferric chloride (65 mg/L) and calcium chloride (354 mg/L) were added to the wastewater, and the wastewater was stirred while adding sodium hydroxide to adjust pH to from 8.0 through 9.5, to insolubilize arsenic.

The arsenic ion concentration in the supernatant was ≤0.01 mg/L. An experiment was conducted in the same manner as in Example 3, except the above described.

The dehydration performance as the filtration efficiency was evaluated in the same manner as in Example 3. The evaluation result of Example 15 is presented in Table 1-3.

Comparative Example 1

An experiment was conducted in the same manner as in Example 1, except that unlike in Example 1, the filtration aid 1 was not used.

The dehydration performance as the filtration efficiency was evaluated in the same manner as in Example 1. The evaluation result of Comparative Example 1 is presented in Table 1-4.

Comparative Example 2

An experiment was conducted in the same manner as in Example 2, except that unlike in Example 2, the filtration aid 1 was not used and the adding amount of the polymeric flocculant relative to the solid content was 7 mg/L.

The dehydration performance as the filtration efficiency was evaluated in the same manner as in Example 2. The evaluation result of Comparative Example 2 is presented in Table 1-4.

Comparative Example 3

An experiment was conducted in the same manner as in Example 3, except that unlike in Example 3, a pulverized product was obtained by performing pulverization in a manner that the median diameter would be 140 micrometers.

The dehydration performance as the filtration efficiency was evaluated in the same manner as in Example 3. The evaluation result of Comparative Example 3 is presented in Table 1-4.

Comparative Example 4

An experiment was conducted in the same manner as in Example 3, except that unlike in Example 3, a pulverized product obtained by performing pulverization in a manner that the median diameter would be 140 micrometers was used, and the polymeric flocculant was not added when adding the filtration aid 1 (the adding amount of the filtration aid was 7 mg/L).

The dehydration performance as the filtration efficiency was evaluated in the same manner as in Example 3. The evaluation result of Comparative Example 4 is presented in Table 1-4.

Comparative Example 5

An experiment was conducted in the same manner as in Example 1, except that unlike in Example 1, a commercially available dehydration aid EBAGROS U-700 (available from Swing Corporation) was used instead of the filtration aid formed of the *Corchorus olitorius*.

The dehydration performance as the filtration efficiency was evaluated in the same manner as in Example 1. The evaluation result of Comparative Example 5 is presented in Table 1-5.

Comparative Example 6

An experiment was conducted in the same manner as in Example 1, except that unlike in Example 1, a commercially available dehydration aid EBAGROS U-710 (available from Swing Corporation) was used instead of the filtration aid formed of the *Corchorus olitorius*.

The dehydration performance as the filtration efficiency was evaluated in the same manner as in Example 1. The evaluation result of Comparative Example 6 is presented in Table 1-5.

Comparative Example 7

An experiment was conducted in the same manner as in Example 1, except that unlike in Example 1, a commercially available dehydration aid AK FIBER (available from Asano Eco-solutions co., ltd.) was used instead of the filtration aid formed of the *Corchorus olitorius*.

The dehydration performance as the filtration efficiency was evaluated in the same manner as in Example 1. The evaluation result of Comparative Example 7 is presented in Table 1-5.

TABLE 1-1

|  | Ex. 1 | Ex. 2 | Ex. 3 | Ex. 4 | Ex. 5 |
| --- | --- | --- | --- | --- | --- |
| Target ion | Ni | Ni | Ni | Ni | Ni |
| Corchorus olitorius | Corchorus olitorius | Corchorus olitorius | Intermediate jute No. 4 | Intermediate jute No. 4 | Intermediate jute No. 4 |
| Median diameter (micrometer) | 200 | 200 | 200 | 200 | 200 |
| Adding amount (mg/L) of filtration aid and/or polymeric flocculant | 7 | 7 | 7 | 7 | 7 |
| Polymeric flocculant | — | PAM | PAM | PAM | PAM |
| Corchorus olitorius:polymeric flocculant ratio | — | 5:5 | 5:5 | 9:1 | 7:3 |
| Ratio of filtration quantity | C | B | A | B | A |

TABLE 1-2

|  | Ex. 6 | Ex. 7 | Ex. 8 | Ex. 9 | Ex. 10 |
| --- | --- | --- | --- | --- | --- |
| Target ion | Ni | Ni | Ni | Ni | F |
| Corchorus olitorius | Intermediate jute No. 4 | Intermediate jute No. 4 | Intermediate jute No. 4 | Intermediate jute No. 4 | Intermediate jute No. 4 |
| Median diameter (micrometer) | 200 | 200 | 200 | 150 | 200 |
| Adding amount (mg/L) of filtration aid and/or polymeric flocculant | 7 | 3.5 | 1 | 7 | 7 |
| Polymeric flocculant | PAM | PAM | PAM | PAM | PAM |
| Corchorus olitorius:polymeric flocculant ratio | 3:7 | 5:5 | 5:5 | 5:5 | 5:5 |
| Ratio of filtration quantity | A | B | C | C | A |

TABLE 1-3

|  | Ex. 11 | Ex. 12 | Ex. 13 | Ex. 14 | Ex. 15 |
| --- | --- | --- | --- | --- | --- |
| Target ion | Fe | Cu | Zn | Cr | As |
| Corchorus olitorius | Intermediate jute No. 4 | Intermediate jute No. 4 | Intermediate jute No. 4 | Intermediate jute No. 4 | Intermediate jute No. 4 |
| Median diameter (micrometer) | 200 | 200 | 200 | 200 | 200 |
| Adding amount (mg/L) of filtration aid and/or polymeric flocculant | 7 | 7 | 7 | 7 | 7 |

TABLE 1-3-continued

|  | Ex. 11 | Ex. 12 | Ex. 13 | Ex. 14 | Ex. 15 |
|---|---|---|---|---|---|
| Polymeric flocculant | PAM | PAM | PAM | PAM | PAM |
| Corchorus olitorius:polymeric flocculant ratio | 5:5 | 5:5 | 5:5 | 5:5 | 5:5 |
| Ratio of filtration quantity | A | A | A | A | A |

TABLE 1-4

|  | Comp. Ex. 1 | Comp. Ex. 2 | Comp. Ex. 3 | Comp. Ex. 4 |
|---|---|---|---|---|
| Target ion | Ni | Ni | Ni | Ni |
| Corchorus olitorius | — | — | Intermediate jute No. 4 | Intermediate jute No. 4 |
| Median diameter (micrometer) | — | — | 140 | 140 |
| Adding amount (mg/L) of filtration aid and/or polymeric flocculant | — | 7 | 7 | 7 |
| Polymeric flocculant | — | PAM | PAM | — |
| Corchorus olitorius:polymeric flocculant ratio | — | — | 5:5 | — |
| Ratio of filtration quantity | D | D | D | D |

TABLE 1-5

|  | Comp. Ex. 5 | Comp. Ex. 6 | Comp. Ex. 7 |
|---|---|---|---|
| Target ion | Ni | Ni | Ni |
| Dehydration aid | U-700 | U-710 | AK FIBER |
| Average length (longer axis direction) of dehydration aid | 5 mm | 10 mm | Some millimeters |
| Adding amount (mg/L) of dehydration aid | 7 | 7 | 7 |
| Polymeric flocculant | — | — | — |
| Corchorus olitorius:polymeric flocculant ratio | — | — | — |
| Ratio of filtration quantity | D | D | D |

Example16

A filtration treatment experiment was conducted in the same manner as in Example 3, except that unlike in Example 3, "intermediate jute No. 3", "intermediate jute No. 1", and "intermediate kenaf" were used as *Corchorus olitorius* instead of the "intermediate jute No. 4" (however, only the kind was changed, and other conditions such as median diameter and adding amount were the same). FIG. 1 plots temporal change of the filtration quantity, representing the dehydration performance as the filtration efficiency.

It was confirmed from the results of Examples 1 to 16 that the filtration aid of the present invention was a filtration aid that was able to improve the filtration efficiency (shorten the filtration time) and was excellent in the dehydration performance.

Particularly, from the result of Example 9 compared with Comparative Example 3, it was found that a median diameter of the pulverized product of 140 micrometers was insufficient for *Corchorus olitorius* to exert the dehydration performance, and a median diameter of 150 micrometers or greater would improve the dehydration performance.

It was confirmed from the result of Example 16 that the intermediate jute No. 4 exhibited the best dehydration performance among *Corchorus olitorius*, and that the intermediate jute No. 1, the intermediate kenaf, and the intermediate jute No. 3 exhibited the next best results in this order.

The invention claimed is:

1. A method for treating wastewater including an inorganic unnecessary substance comprising an inorganic ion, comprising the steps of:
   providing a wastewater including an inorganic unnecessary substance containing at least any one of nickel, fluorine, iron, copper, zinc, chromium, arsenic, cadmium, and lead, and containing an inorganic ion which is at least any one of a nickel ion, a fluorine ion, an iron ion, a copper ion, a zinc ion, a chromium ion, an arsenic ion, a cadmium ion, and a lead ion;
   insolubilizing an inorganic ion contained in the inorganic unnecessary substance included in the- wastewater to form a microfloc of suspended solid matter;
   adding a composition comprising a filtration aid consisting of a pulverized product of *Corchorus olitorius* and a polyacrylamide to wastewater including the microfloc, wherein a median particle diameter of the pulverized product is 200 micrometers or greater but 850 micrometers or less, and wherein the adding amount of the *Corchorus olitorius* in the filtration aid is 2 mg/L or greater relative to a solid content in the wastewater including the microfloc; and
   filtering the wastewater to which the filtration aid has been added.

2. The method of treating wastewater according to claim 1, comprising:
   adding a flocculant to the wastewater including the microfloc with
   stirring to precipitate the microfloc, and settling the wastewater including the precipitated microfloc to separate the wastewater into a supernatant and sludge prior to addition of the filtration aid.

3. The filtration treatment method according to claim 1, wherein a ratio by mass between an adding amount of the *Corchorus olitorius* in the filtration aid and an adding amount of the polyacrylamide is from 90:10 through 10:90.

4. The filtration treatment method according to claim 3, wherein the ratio by mass between the adding amount of the *Corchorus olitorius* in the filtration aid and the adding amount of the polyacrylamide is from 70:30 through 30:70.

5. The filtration treatment method according to claim 1, comprising the step of classifying and removing the filtration aid having a particle diameter less than 150 micrometers and greater than 850 micrometers prior to adding the filtration aid to the microfloc.

6. The filtration treatment according to claim 1, wherein an adding amount of the *Corchorus olitorius* and the polyacrylamide in the filtration aid is 7 mg/L or greater relative to a solid content in the wastewater including the microfloc.

* * * * *